Oct. 11, 1955     H. G. HENRICKSON     2,720,290
CLAMP ASSEMBLY FOR STRUCTURAL ELEMENTS

Filed June 5, 1951     3 Sheets—Sheet 1

INVENTOR.
Henry G. Henrickson
BY
James E. Toomey
ATTORNEY

Oct. 11, 1955 H. G. HENRICKSON 2,720,290
CLAMP ASSEMBLY FOR STRUCTURAL ELEMENTS
Filed June 5, 1951 3 Sheets-Sheet 2

INVENTOR.
Henry G. Henrickson
BY
James E. Toomey
ATTORNEY

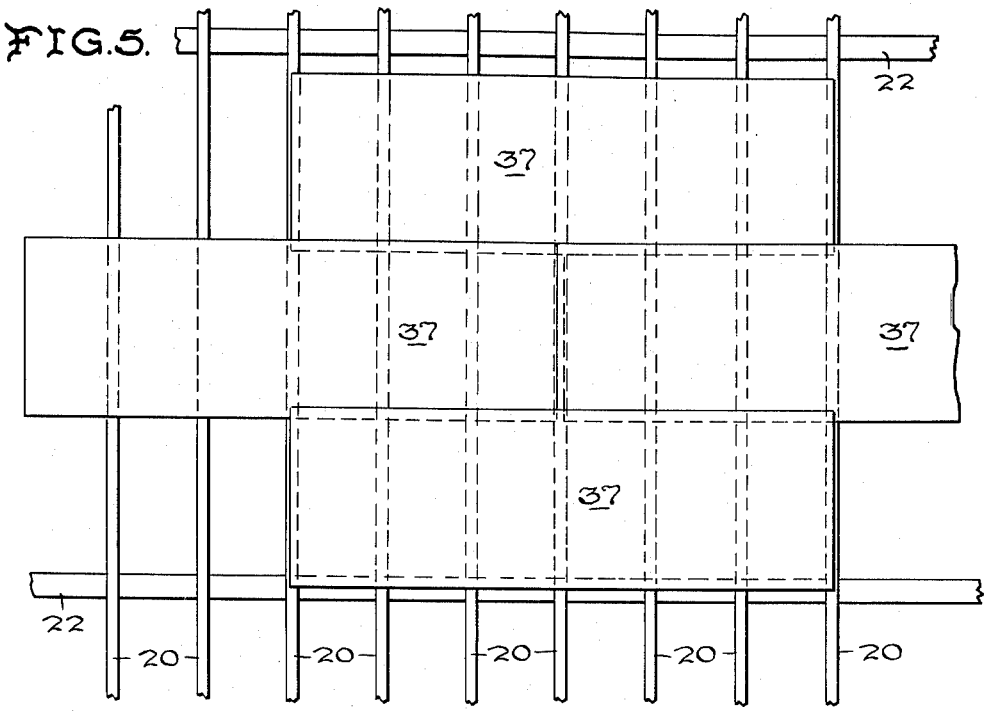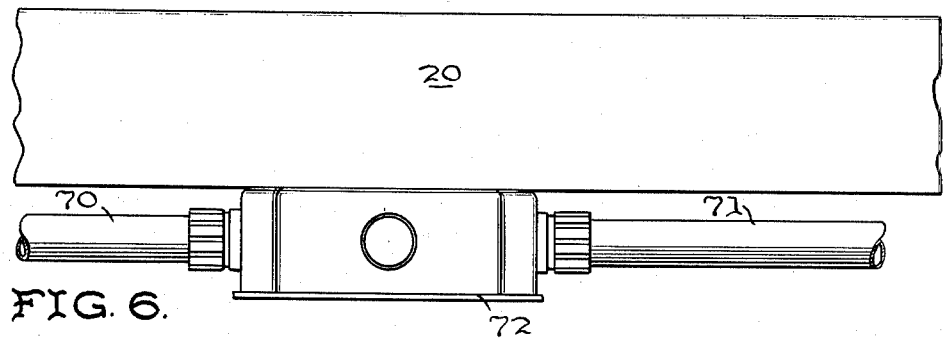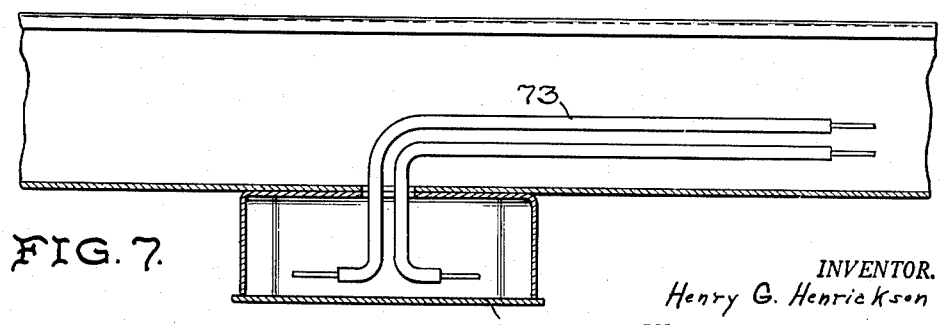

United States Patent Office 2,720,290
Patented Oct. 11, 1955

2,720,290

CLAMP ASSEMBLY FOR STRUCTURAL ELEMENTS

Henry G. Henrickson, Des Plaines, Ill., assignor, by mesne assignments, to Kaiser Aluminum & Chemical Corporation, Oakland, Calif., a corporation of Delaware Application June 5, 1951, Serial No. 230,033

3 Claims. (Cl. 189—36)

This invention relates to the construction of metallic roofs, floors and the like. More particularly it is concerned with providing novel fastening means for locking together the several load bearing members commonly employed to support a plurality of sheet metal units, which units when emplaced combine with the supporting members to produce a light but strong and rigid metal foundation for roofs, floors and the like.

Various types of fasteners and their associated fittings have been suggested in the past for metal foundations but they have not proven entirely satisfactory. Certain of the designs proposed in the past have been of such an intricate and complex nature that the use and handling thereof at the construction site have required special skill and handling. In addition because of the complex design of the fastening elements special tools were frequently required at the building site to assemble the fastening elements and secure them to the load bearing members.

Another difficulty with these types of fasteners resided in the fact that they were relatively inflexible, i. e., they were not readily and conveniently adaptable to varying conditions of installation. Certain of these fasteners and fittings although they satisfied the requirement for simplicity of design and ease of assembly were of little value since they failed to lock the load bearing members securely together. Others could not be attached to the load bearing members without first being welded thereto. Thus in the event these latter types of fasteners were used with load bearing members made of galvanized steel it was impossible to affix them to the steel members without rupturing the galvanic coating on the steel members at the point of the weld so that the load bearing members would subsequently be exposed to the elements with the result that corrosion and oxidation would occur at the point of the weld.

Other of the fasteners developed were not readily adjustable and were not subject to being easily and readily drawn together to provide an efficient locking means.

As a consequence of all this it was often commercially unfeasible to exploit the metal foundations developed in the past because of the failure of the fastening elements designed to lock together the primary load bearing or supporting members upon which the sheet metal panel members were superimposed.

One of the primary objects of this invention therefore is to provide a novel fastening means for rigidly and efficiently securing the load bearing members of a sheet metal foundation together.

Another object of this invention is to provide a novel fastener for rigidly securing the load bearing members of a sheet metal foundation together, which is of relatively simple construction and which can be inexpensively manufactured.

Another object of this invention is to provide fastening elements for securing the load bearing members of a sheet metal foundation together which are adaptable to varying conditions of installation and subject to simple and ready adjustment.

A further object of this invention is to provide novel fastening elements for securing load bearings members together, which can be assembled at the construction site with a minimum number of tools.

A further object of this invention is to provide novel fastening elements for securing several cooperating load members together which when preliminarily installed can be tightened without having to manually hold the various fastening elements together during the tightening and adjusting operation.

These and other objects are accomplished by providing in a sheet metal foundation and the like wherein a sheet metal panel is supported by and secured to a hollow rib arranged at an angle upon and carried by a load bearing member, the improvement which comprises an adjustable clamp assembly for removably securing the hollow rib to the load bearing member. The clamp assembly is comprised of a hanger strap provided with a main body portion adapted to contact the panel bearing surface of the rib, and depending leg portions having outwardly projecting flanges thereon. A clasp element is adapted to cooperate with the strap, and this clasp element is also provided with a main body portion and a plurality of leg portions, one of which leg portions is adapted to engage the under-surface of the hollow rib while another of the leg portions is adapted to engage the load bearing member. Means are also provided for removably securing the flanges on the strap to the clasp element.

Further and more specific objects, features and advantages of the instant invention will more clearly appear from a consideration of the following detailed description when taken in conjunction with the accompanying drawings, wherein, Figure 1 is a perspective view partially broken of the clamp fastener assembly of the present invention as it is applied to a hollow sheet supporting rib and a load bearing member or purlin;

Figure 5 is a fragmentary top plan view of the sheet metal foundation which employs the clamp assemblies of the present invention and showing the staggered and overlapping arrangement of the sheet metal panels in one row with respect to the panels in adjacent rows;

Figure 6 is a side elevational view of a hollow rib disclosing the manner in which one or more cable conduits may be externally attached thereto; and Figure 7 is a sectional view of a hollow rib showing the manner in which the hollow rib itself can be used to house electrical wiring and the like.

Figure 1:
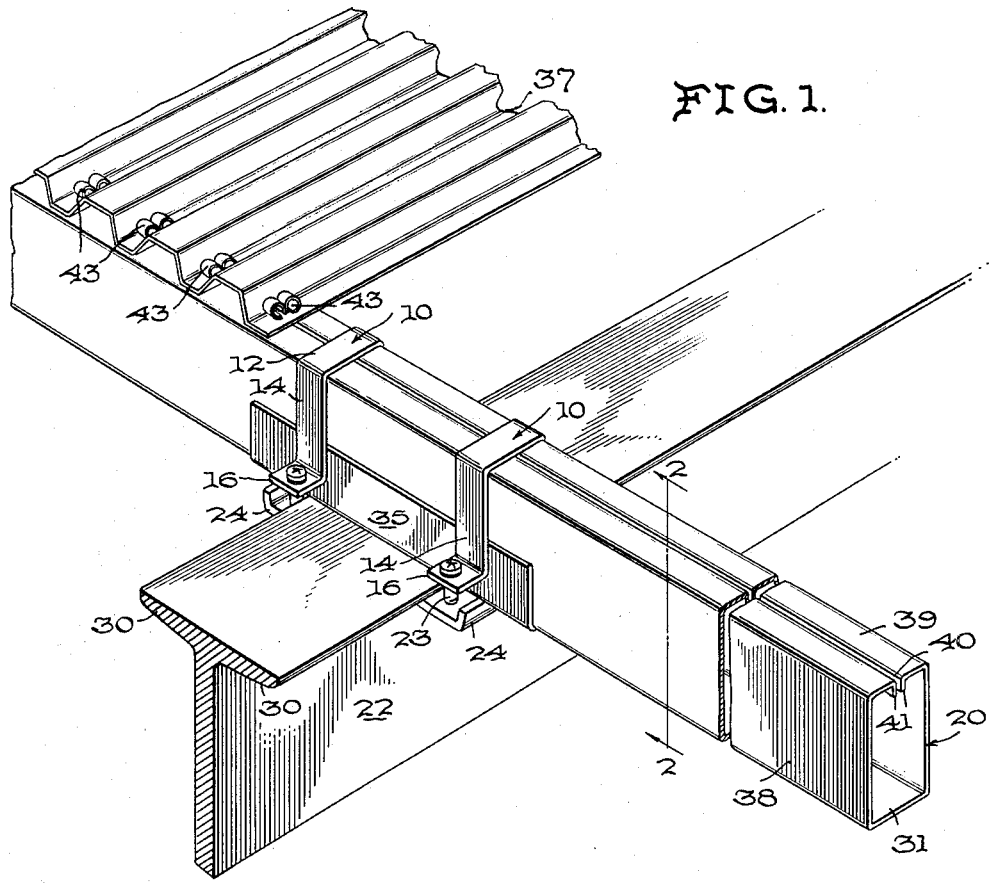
Figure 2:
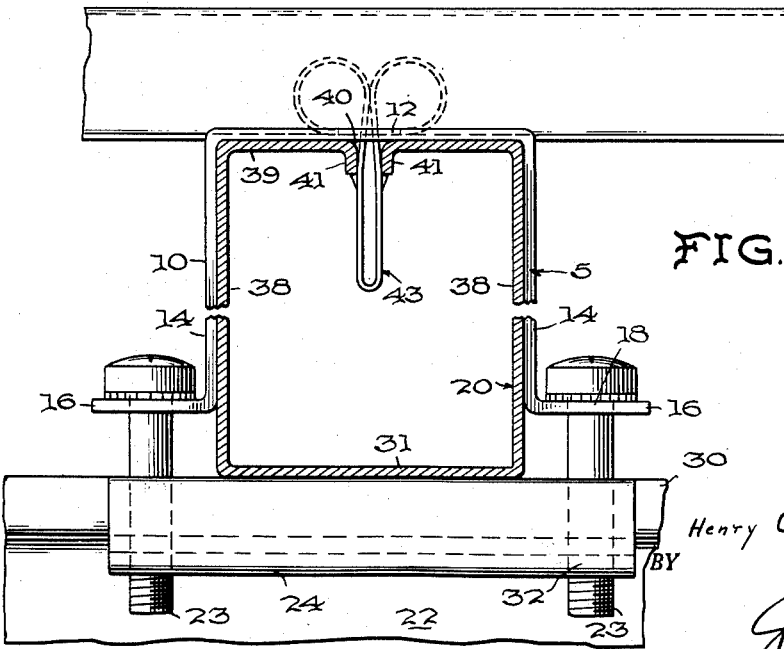
Figure 2 is a broken cross-sectional view of a hollow rib taken along lines 2—2 of Figure 1 and with the channel shaped reinforcing jacket shown in Figure 1, which is adapted to encompass the bottom portion of the hollow rib, removed.
Figures 3, 4:
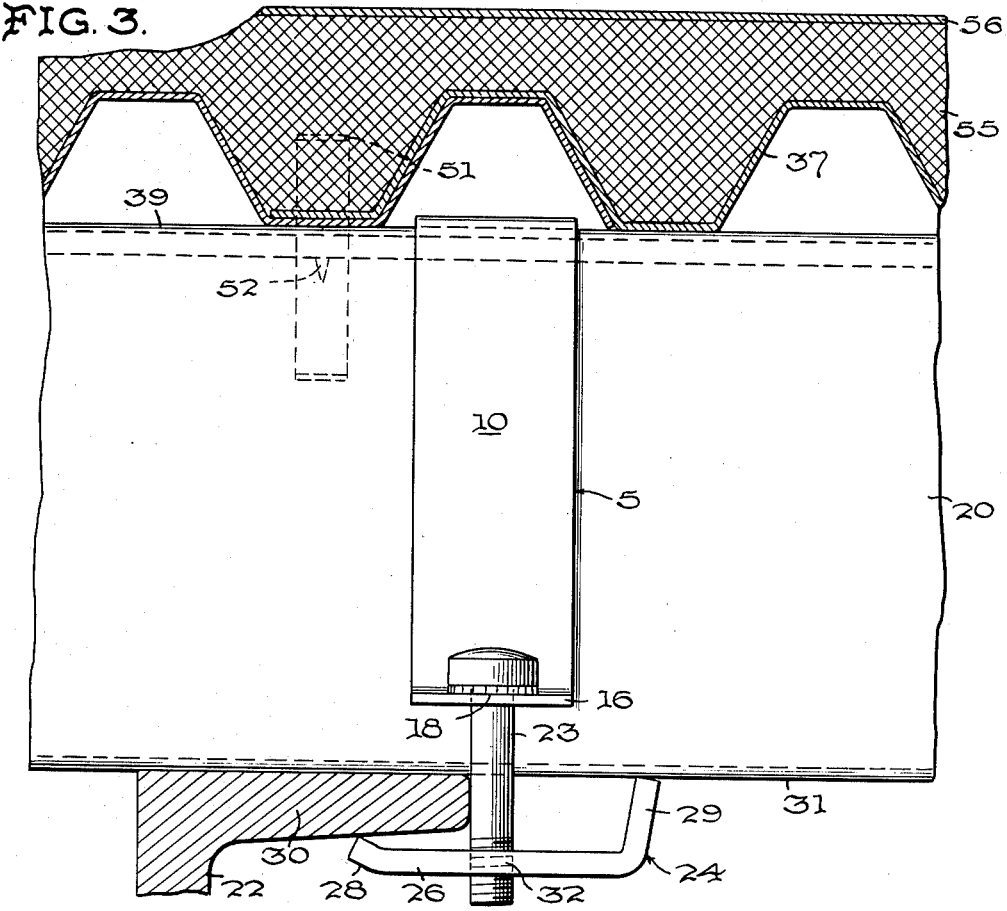
Figure 3 is an elevational side view of the clamp fastener assembly attached to a V-shaped supporting member and a sheet metal supporting hollow rib.
Figure 4 is a broken cross-sectional view of a hollow sheet metal supporting rib and a suitable fastening clip for attaching the sheet metal panel to the rib.

With further reference to the drawings and particularly Figures 1, 2 and 3, it will be observed that the clamp fastener assembly 5 of the present invention is generally comprised of a U-shaped hanger strap 10, having a main body or web portion 12 and depending leg portions 14, the lower extremities of which are provided with laterally and outwardly projecting flange portions 16. Each flange portion is further provided with a bolt hole or aperture 18.

This hanger strap is adapted to be suspended or hung about a hollow rib 20, which in turn is arranged at an angle upon a load bearing member or purlin 22.

Hollow rib 20 is secured to the purlin 22 by means of the above described strap when the strap is locked by means of threaded bolts 23 to an elongated clasp element 24 preferably comprised of a main body portion 26 and a pair of oppositely disposed upwardly and angularly projecting leg portions 28 and 29, leg portion 28 being adapted to frictionally engage the undersurface of the flange 30 of the purlin or load bearing member and leg 29 being adapted to frictionally engage the undersurface 31 of hollow rib 20.

It will be observed that clasp element 24 is elongated in design and is provided with a plurality of internally threaded apertures 32. One of these apertures is located at each end of the clasp element adjacent the side of hollow rib 20 so that the threaded bolt 23, which has previously been inserted in holes 18 of flanges 16, may be inserted therein and then turned so as to bring each individual leg portion of strap 14 and the main body portion 26 of clasp element 24 closer together and thereby lock rib 20 to purlin 22. If desired a nut (not shown) may be advantageously affixed to the threaded end portion of a bolt 23 which protrudes from an aperture 32 in the clasp 24 after it is turned therein so as to increase the tightening effect of each bolt 23 during the drawing together of the strap and clasp element.

It will likewise be noted by referring to Figure 1 that where the purlin or load bearing member 22 is of the T, I or H beam type, two clamp assemblies may be used one for each laterally projecting flange of the beam.

In an advantageous embodiment of the invention a protective channel-shaped jacket or shoe 35 may be located, if desired, about the lower portion of hollow rib 20 so that it is positioned intermediate purlin 22 and rib 20 at the point where these two load bearing members intersect. In this event the undersurface of jacket 35 will be in immediate contact with the legs 29 of the clasp element instead of lower surface 31 of the rib 20. This jacket in addition to acting as a protective element also functions as a wedge between strap 10 and clasp element 24 and thus increases the tautness and rigidity of the clamp assembly as a whole. This jacket has a further function which will be discussed later with respect to the fastening clips employed to secure the sheet metal panel units 37 directly to the top of the hollow ribs 20.

By referring to the drawings it will be noted that each hollow rib 20 is generally formed in such a way from a sheet of springy metal of suitable strength and gauge, preferably a thin strip of spring steel, that it is provided with a substantially flat end or bottom 31 previously referred to and side walls 38 the latter of which are successively bent at their upper extremities so as to form a supporting surface 39 of substantial area provided with an open mouth or slot 40 defined or encompassed by the downturned flanges or lips 41 on the supporting surface 39.

As disclosed in Figures 2 and 4 of the drawings, the downturned flanges which define the open mouth portion 40 are so angled that they normally contact one another. They may be easily displaced however by a clip fastening element 43 or the like inserted in the open mouth portion 40 after the fastening element 43 having been previously thrust through a suitable opening in the sheet metal panel unit 37 which is preferably of a corrugated type thereby anchoring the sheet metal panel unit to the upper bearing surface 39 of the rib 20.

Although these clip fasteners may be of any suitable type or design they are preferably as shown in Figures 2, 3, and 4 formed from a single flat strip of spring metal of suitable length, gauge and resiliency, which strip is bent intermediate its ends to form a rounded nose portion 48 from which extend upwardly projecting laterally spaced leg portions 50 and 50' each of which terminates in a rounded or arcuate head portion 51. Each leg portion is also provided with a protuberance or fin 52 which is adapted to positively engage the downturned lips 41 of hollow rib 20 as the panel unit is locked to the rib. When the lower portion of clip 43 has been inserted in the mouth portion 40 of a hollow rib in such a way that the fins 52 on the clip are in engagement with the lips 41 on the rib, it will be observed that the fins 52 will always be under tension, due to the clamping action of the lips 41 about the springy legs 50 and 50' of the clip as well as the spring action of the head portion 51 of the clip against the top of the sheet metal panel 37. This allows for a substantial tolerance in the opening of the lip portions 41 of the hollow rib without at the same time permitting the sheet metal panel 37 to become unlocked from the rib.

In other words if for some reason the mouth 40 of the hollow rib should be forced open due to excessive loads or pressure the fins 52 on the clip would follow the lip portions 41 of the rib in their movement and remain in contact therewith. This clip fastener is more fully described in my co-pending application S. N. 230,032, filed June 5, 1951.

At the point where several corrugated panels 37 overlap on the rib the fastening clip may be so made that the fins or ears 52 thereon will be spaced a suitable distance down the legs 50 to allow two sheets 37 instead of only one to be fastened to the rib 20.

Although the fins 52 on the clip fasteners successfully prevent removal of the panels 37 upward because of their abutting relationship with the lips 41 they do permit movement of the sheets sideways for the purposes of properly adjusting them with respect to each other.

In connection with the use of these types of fasteners 43 it will be further observed that the straps 10 of the clamp assembly play an important role since by means of their depending leg portions 14 they tend to keep the side walls 38 of the box beams from being laterally displaced whereby the mouth or slot 40 on the box beam might be opened, once the clip fasteners 43 have been inserted therein. When the channel shaped jacket 35 is used it also functions in a like manner.

Any number of clip fasteners 43 may be employed depending on the results desired and when corrugated panels are used they are inserted through openings located in the troughs of the corrugations in the panels.

These corrugated sheet metal panels are arranged upon the ribs 20 in such a way that the corrugations are at an angle thereto, i. e., the corrugations run substantially parallel to the purlins 22. The preferred arrangement also contemplates that the sheets 37 be placed in parallel rows upon the ribs in such a way that the ends of the sheets in one row are not in line with the ends of the sheets in an adjacent row. This staggered arrangement of the parallel rows of sheets provides for greater rigidity and strength of the panel assembly as a whole.

It will also be observed that the use of the clamp assembly 5 for attaching the ribs 20 to the purlins 22 in no way interferes with arranging the sheets in each parallel row in such a way that the end of a sheet in one row cannot be overlapped by an adjacent sheet in the same row as indicated in Figure 5. As is also indicated in Figures 3 and 5 use of these clamp assemblies 5 also permits overlapping the side longitudinal edges of the sheets in one row with the longitudinal edges or margins of the sheets in an adjacent parallel row in the manner of shingles.

This overlapping of the sheets at the ends and sides is important in order to provide a continuous contact between all the sheets at all times thereby preventing any leakage of water, etc., therethrough.

Although it is obvious that the rigid and strong panel assembly, which has heretofore been described and which is made possible by the use of clamp assemblies 5 for securing the load bearing members 20 and 22 together, may be utilized in and of itself as a suitable roof or floor and the like of a building it is primarily designed as a foundation or deck for a roof. Accordingly a suitable insulating material 55 which may be of asbestos or felt is ordinarily adhesively united to the upper surfaces of the sheets 37 and a vapor sealing metal strip 56 placed thereover. A coating of asphalt may be used to protect the insulation in lieu of strip 56 or as a substitute for the insulation itself in which event it will be obvious that the overlapping of the sheets will effectively prevent the seeping of hot asphalt therethrough when it is applied to the upper surface of the panels.

It will be further observed by referring to Figures 6 and 7 that the hollow rib 20 may also be advantageously used in the installation of wiring in a building. For example, as indicated in Figure 6 cable carrying conduits 70 and 71 and a junction box or housing 72 may be suspended by suitable means from the hollow rib 20 and between the purlins 22 (not shown).

Alternately the hollow rib 20 as shown in Figure 7 may itself be employed as a housing for the electrical cable 73, which enters the rib 20 from a suitable junction box 74, attached to rib 20 at a convenient point thereon. In this later case when the cable 73 is located within the rib it is frequently possible to use ordinary BX cable instead of armored cable in the electrical wiring since the rib itself serves as the armor. In this way also it is possible to reduce the cost of the cable and simplify the installation of the wiring.

The number of clamp assemblies used for any one complete metal foundation will in turn depend upon the number of ribs 20 that are used as well as the number and types of purlins 22 that are employed.

By the use of these clamp assemblies there is no need to employ welding tools at the construction site to weld the rib directly to a purlin or to secure other cooperating fastening elements to one or both of these members.

Furthermore, these clamp assemblies can be adjusted and drawn tight about the ribs and purlins without unnecessarily and permanently deforming the former.

They are also flexible and can be adjusted in a minimum amount of time and with ease. Only a suitable wrench or the like is needed to tighten the bolts 23 in order to draw the clamp assembly tight about the rib and purlin.

At the same time the strap and clasp elements are sufficiently movable to permit proper alignment of the sheets with the edges of the roof even though the supporting members are not quite straight.

In addition once the strap 10 has been placed over the rib and the clasp 24 loosely attached thereto the workman can remove his hands therefrom. In this way his hands are left free to adjust the several parts and to tighten them, and without having to be anxious about their remaining in proper alignment during the tightening process.

Finally and what is most important is the fact that the whole clamp assembly can be removed easily at any time so that minor adjustments in properly aligning the ribs 20 with purlins 22 can be easily made or in the event it is desirable to dismantle the entire roof deck.

Thus the clamp assembly provides an extremely efficient yet flexible fastening means and allows the installation of the roof deck in many and varied types of building constructions.

Although the ribs 20 are advantageously made of springy metal, such as spring steel and the panels of aluminum, it is obvious that other types of metals may be used such as magnesium.

In addition it will be clearly recognized that although the panel assembly with which the clamp fastener elements of the instant invention are associated has been described with particular reference to its use as the foundation or deck for the roof of a building, the same panel assembly and clamp fastener elements can be utilized equally well in the construction of walls, roofs, floors and the like for trucks, trailers, ships and railroad cars.

An advantageous arrangement of the invention has been herein illustrated and described. It will be understood, however, that various changes in the construction and design of the parts may be made without departing either from the true spirit or scope of the invention as defined by the appended claims.

I claim:

1. In a roof deck construction of the character described, wherein a sheet metal panel is supported by and secured to the top of a hollow rib arranged at an angle upon and carried by a load bearing member, said load bearing member having an upper flanged portion of large surface area, and said rib having a bottom portion of large surface area in immediate opposed relation with and located in a horizontal plane parallel to that of the upper surface of the flanged portion of said load bearing member, the improvement which comprises an adjustable clamp assembly removably securing the hollow rib to said load bearing member, said clamp assembly comprising a hanger strap and a cooperating clasp element, said strap being provided with a flat main body portion in contact with the upper panel bearing surface of the rib, a plurality of downwardly projecting leg portions and a flange projecting laterally and outwardly from each of said leg portions, said clasp element also being provided with a main body portion and a pair of spaced upwardly projecting horizontally elongated leg elements, one of said leg elements being in opposed clamping relation with respect to the bottom portion of said hollow rib and the other of said leg elements being in opposed clamping relation with respect to the undersurface of the flanged portion on said load bearing member, and adjustable screw means engaging and removably locking the flanges on the hanger strap to the said clasp element.

2. In a roof deck construction of the character described, wherein a sheet metal panel is supported by and secured to the flat top of a hollow rib arranged at an angle upon and carried by a load bearing member, said load bearing member having an upper flanged portion of large surface area and said rib having a bottom portion of large surface area in immediate opposed relation with and located in a horizontal plane parallel to that of the flanged portion of said load bearing member, the improvement which comprises an adjustable clamp assembly removably securing the hollow rib to said load bearing member, said clamp assembly including an elongated sheet metal channel-shaped jacket snugly fitting about the lower portion of said rib and interposed between said rib and the opposed surface of the flanged portion of said load bearing member, a hanger strap provided with a main body portion in contact with the panel bearing surface of said rib at a point above said jacket, and depending leg portions having outwardly projecting flanges thereon, and a clasp element cooperating with said strap and jacket, said clasp element also being provided with a main body portion and a pair of spaced upwardly projecting and horizontally elongated leg elements, one of said leg elements frictionally engaging the bottom portion of said jacket and the other of said leg elements frictionally engaging the undersurface of the flanged portion on said load bearing member, and adjustable screw means engaging and removably locking the flanges on the strap to the said clasp element.

3. The combination defined in claim 2, wherein the leg element on said clasp member which engages the bottom portion of said jacket contacts said jacket at a point spaced from the flanged portion of said load bearing member.

References Cited in the file of this patent

UNITED STATES PATENTS

| | | |
|---|---|---|
| 789,894 | Williams | May 16, 1905 |
| 1,319,652 | Korns | Oct. 21, 1919 |
| 1,597,310 | Campbell | Aug. 24, 1926 |
| 1,749,637 | Kingston | Mar. 4, 1930 |
| 1,838,123 | White | Dec. 29, 1931 |
| 2,187,642 | Brown | Jan. 16, 1940 |
| 2,231,880 | Buelow | Feb. 18, 1941 |
| 2,426,237 | Pfeifer, Jr. | Aug. 26, 1947 |